United States Patent
Ren et al.

(10) Patent No.: US 9,941,828 B2
(45) Date of Patent: Apr. 10, 2018

(54) SYSTEM AND METHOD FOR STABILIZING SUB-SYNCHRONOUS INTERACTION OF A WIND TURBINE GENERATOR

(71) Applicant: General Electric Company, Schenectady, NY (US)

(72) Inventors: Wei Ren, Niskayuna, NY (US); Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 14/633,452

(22) Filed: Feb. 27, 2015

(65) Prior Publication Data
US 2016/0254769 A1    Sep. 1, 2016

(51) Int. Cl.
*H02P 9/10*    (2006.01)
*F03D 7/00*    (2006.01)
(Continued)

(52) U.S. Cl.
CPC ............. *H02P 9/105* (2013.01); *F03D 7/00* (2013.01); *F03D 9/255* (2017.02); *H02J 3/386* (2013.01); *H02P 9/007* (2013.01); *Y02E 10/763* (2013.01)

(58) Field of Classification Search
CPC .......... H02P 9/105; H02P 9/007; H02J 3/386; F03D 9/003; F03D 7/00; Y02E 10/763
See application file for complete search history.

(56) References Cited

U.S. PATENT DOCUMENTS 5,565,752 A * 10/1996 Jansen ................ H02K 17/165
                                          310/169
7,372,174 B2 * 5/2008 Jones ..................... H02P 9/102
                                           290/43
(Continued)

FOREIGN PATENT DOCUMENTS

EP         2544358 A1     1/2013
WO     20120159989 A2    11/2012

OTHER PUBLICATIONS

Wang (Physical Modeling of Wind Turbine Generators in a Small Scale Analog System. Article. [online]. 2014.); retrieved on Feb. 3, 2017; From internal STIC service in USPTO.*

(Continued)

*Primary Examiner* — Sean Shechtman
*Assistant Examiner* — Marzia T Monty
(74) *Attorney, Agent, or Firm* — Dority & Manning, P.A.

(57) ABSTRACT

The present disclosure is directed to a system and method for stabilizing sub-synchronous interaction (SSI) of a wind turbine generator connected to a power grid. More specifically, the method includes measuring an alternating-current (a-c) quantity of the power grid. Another step includes converting the a-c quantity to a d-q quantity and providing the d-q quantity to a d-q control loop within the controller. Another step includes altering, with a symmetric control component, a transfer function of the d-q control loop. The method also includes generating at least one d-q reference signal for the wind turbine generator based on the altered transfer function so as to achieve symmetric control of the generator. A further step includes generating a control signal for the generator based, at least in part, on the at least one d-q reference signal. The method also includes operating the generator based on the control signal.

9 Claims, 10 Drawing Sheets

(51) Int. Cl.
  *H02P 9/00*   (2006.01)
  *H02J 3/38*   (2006.01)
  *F03D 9/25*   (2016.01)

(56) References Cited

U.S. PATENT DOCUMENTS

2012/0056602 A1    3/2012   Li et al.
2013/0176751 A1    7/2013   Olea et al.
2016/0254769 A1*   9/2016   Ren .................... H02P 9/105
                                                290/44

OTHER PUBLICATIONS

Search Report and Written Opinion issued in connection with corresponding EP Application No. 16155653.5 dated Aug. 10, 2016.

Jiang et al., "A frequency scanning method for the identification of harmonic instabilities in HVDC systems," IEEE Trans. Power Delivery, vol. No. 10, pp. 1875-1881, Oct. 1995.

Mohaddes et al., "Steady state frequency response of STATCOM," IEEE Transactions on Power Delivery, vol. No. 16, Issue No. 1, pp. 18-23, Jan. 2001.

Belkin, "Event of Oct. 22, 2009", CREZ Technical Conference, Electric Reliability Council of Texas, Jan. 26, 2010.

Larsen, "Wind generators and series-compensated AC transmission lines", IEEE PES T&D Conference, May 2012.

Badrzadeh et al.,"Sub-synchronous Interaction in Wind Power Plants—Part I: Study Tools and Techniques", 2012 IEEE Power and Energy Society General Meeting, San Diego, California, Jul. 2012.

\* cited by examiner

SYSTEM AND METHOD FOR STABILIZING SUB-SYNCHRONOUS INTERACTION OF A WIND TURBINE GENERATOR

FIELD OF THE INVENTION

The present invention relates generally to the field of wind turbine generators, and more particularly, to systems and methods for stabilizing sub-synchronous interaction (SSI) of a wind turbine generator by symmetric control design.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. In many wind turbines, the rotor is attached to the nacelle and is coupled to the generator through the gearbox. The rotor and the gearbox are mounted on a bedplate support frame located within the nacelle. More specifically, in many instances, the gearbox is mounted to the bedplate via one or more torque supports or arms. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to a generator shaft of the generator. The gearbox may be used to step up the inherently low rotational speed of the turbine rotor for the generator to efficiently convert mechanical energy to electrical energy, which is provided to a utility grid.

Transmission of wind energy from remote locations to load centers or to main transmission backbones necessitates long transmission lines. Series capacitors are a proven and economical transmission solution to address system strength, grid stability, and voltage profile issues of long transmission lines. In some instances, wind turbine generators can be susceptible to sub-synchronous interaction (SSI) problems when the generator is connected to the grid through series-compensated transmission lines.

More specifically, wind turbines can interact with the grid resonances created by the series capacitor compensation, thereby causing wind turbine damage and/or misoperation if such interactions are not addressed. Further, wind generators react to grid transients according to their physical characteristics and control logic. When reacting to the sub-synchronous currents caused by series resonances in the grid, such reactions can affect the damping of the resonance. The phenomenon has been termed sub-synchronous interaction (SSI). SSI is benign in many cases, but in other cases, can lead to an electrical instability. When unstable, the sub-synchronous currents and voltages grow until a nonlinear event occurs.

One commonly used method for studying sub-synchronous interaction is frequency scanning analysis. A typical frequency scanning analysis includes establishing a steady state operating condition of the system under test, injecting a current (or voltage) perturbation signal to the steady state system, subtracting the perturbed system voltage and current by their steady state quantities to acquire the small signal delta change, performing Fast Fourier Transform (FFT), calculating the phasor value at the testing frequency, and calculating the system impedance. The steps may be repeated at other frequencies in the range of interest.

In addition, as shown in FIG. 1, the frequency scanning analysis treats the wind turbine generator 12 and the grid network 14 of the circuit 10 as two separate sub-systems. When the two sub-systems 12, 14 are connected together, the outcome is equivalent to summing their respective impedances. As such, a potential instability is indicated by a negative resistance at a resonance frequency (i.e. zero reactance). For example, as shown in FIG. 2, corresponding graphs of resistance versus frequency and reactance versus frequency, respectively, for the circuit 10 are illustrated. More specifically, two resonance frequencies 15, 17 (e.g. at about 10 Hz and about 51 Hz) are identified from the frequency impedance plots generated by the circuit 10. As shown, both resonance frequencies 15, 17 have negative damping as the associated resistances are negative, thereby indicating a potential instability of the system.

Although the above mentioned frequency analysis has been widely used for SSI evaluation, the results of such testing can be misleading due to the deficiencies in the method. For example, one such deficiency is the coupling frequencies effect as illustrated in FIGS. 3-5. More specifically, FIG. 3 illustrates a block diagram of a simplified control function that converts a three phase alternating-current (a-c) quantity (e.g. $X_{abc}$) into a direct quadrature (d-q) rotating coordinate, multiplies the d-q quantity by two gains ($K_d$ and $K_q$) separately, and then reversely converts the result back into an a-c quantity (e.g. $Y_{abc}$). A d-q transformation generally refers to a mathematical transformation that rotates the reference frame of three-phase systems in an effort to simplify the analysis of three-phase circuits. The input $X_{abc}$ and the output $Y_{abc}$ can be voltage, current, or combinations thereof. As shown in FIGS. 4 and 5, two tests are run with different values of $K_d$ and $K_q$ using the control function. The ABC-to-DQ and the DQ-to-ABC transformations are based on the fundamental frequency, e.g. 60 Hz. FIG. 4 illustrates a comparison of the input and output in both the time domain and frequency spectrum from a first test, e.g. when $K_d = K_q = 1.0$. As shown, the output equals to the input. In a second test, as shown in FIG. 5, $K_d$ is different from $K_q$ (i.e. the control becomes asymmetric) and the resulting output $Y_{abc}$ contains an additional frequency component 16 that is not in the input.

As shown in FIG. 6, a graph illustrating the effect of the coupling frequencies effect described above is illustrated. As shown, the graph compares the impedance calculated from the two grid conditions. If there is no coupling frequencies effect, the calculation results in the same generator impedance for both conditions such that the curves should overlap. The distinction between the two curves of FIG. 6, however, demonstrates the impact of coupling frequencies. In addition, the resulting frequency impedances of the generator from the two grid conditions render opposite indications to the SSI stability of the system. For example, when the grid connection is stiffer (curve 18), the generator resistance is positive over the whole sub-synchronous frequency range and therefore indicates no SSI instability. In contrast, when the grid connection is weaker (curve 20), the generator resistance is negative in sub-synchronous frequency range, thereby raising a concern of potential SSI instability. As such, the coupling frequencies effect complicates SSI evaluation for wind turbine generators. Further, the coupling frequencies effect contributes to the difficulty of system design as trying to design a stable system for the infinite number of grid scenarios is almost impossible.

In view of the aforementioned, a system and method that improves sub-synchronous interaction (SSI) damping of a wind turbine generator by utilizing symmetric control design would be advantageous.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a method for operating a wind turbine generator connected to a power grid using direct-quadrature (d-q) control technology. The method includes measuring an alternating-current (a-c) quantity of the power grid. Another step includes converting the a-c quantity to a d-q quantity in a controller of the wind turbine generator. The method also includes providing the d-q quantity to a d-q control loop within the controller. Another step includes altering, with a symmetric control component, a transfer function of the d-q control loop. The method also includes generating at least one d-q reference signal for the wind turbine generator based on the altered transfer function so as to achieve symmetric control of the wind turbine generator. A further step includes generating a control signal for the wind turbine generator based, at least in part, on the at least one d-q reference signal. As such, the method also includes operating the wind turbine generator based on the control signal so as to stabilize sub-synchronous interaction of the wind turbine generator.

In one embodiment, the symmetric control component includes at least one of one or more filters, a control compensator, or similar. In certain embodiments, the one or more filters may include a notch filter, a low-pass filter, a high-pass filter, or combinations thereof, or any other suitable filter.

In further embodiments, the wind turbine generator is a doubly-fed generator having a stator and a rotor. Further, the rotor is coupled to the power grid via a power conversion assembly having a rotor-side power converter and a grid-side power converter. In such an embodiment, the d-q control loop is configured to control a voltage of the rotor via the rotor-side power converter.

In a further embodiment, the d-q reference signal may include at least one of d-axis current reference, a d-axis voltage reference, a q-axis current reference, a q-axis voltage reference, or similar. As such, in certain embodiments, the step of generating the control signal for the wind turbine generator based on the d-q reference signal may further include: providing the d-axis current reference and the q-axis current reference to the rotor-side converter, determining the control signal as a function of the d-axis current reference and the q-axis current reference via the rotor-side converter, and providing the control signal to the doubly-fed generator, wherein the symmetric control component alters the transfer function of the d-axis current reference and the q-axis current reference so as to achieve symmetric control of the wind turbine generator.

In additional embodiments, the control signal may correspond to a current signal, a voltage signal, or similar. In certain embodiments, the q-axis current reference regulates voltage of the wind turbine generator and the d-axis current reference regulates torque of the wind turbine generator.

In still further embodiments, the method may also include calculating the q-axis current reference by determining a proportional integral derivative of a terminal voltage of the wind turbine generator and filtering the derivative. In another embodiment, the method may include calculating the d-axis current reference as a function of a torque reference and a magnetic flux. In particular embodiments, the magnetic flux may be calculated as a function of a terminal voltage of the wind turbine generator. More specifically, the terminal voltage of the wind turbine generator may be provided to the controller, filtered, and multiplied by a multiplier to obtain the magnetic flux.

In another aspect, the present disclosure is directed to a method for stabilizing sub-synchronous interaction (SSI) of a doubly-fed generator of a wind turbine connected to a power grid. The method includes altering, with a symmetric control component, a transfer function of a d-q control loop within a controller of the generator. Another step includes generating at least one d-q reference signal for the generator based on the altered transfer function so as to achieve symmetric control of the wind turbine generator. The method also includes generating a control signal for the wind turbine generator based on the at least one d-q reference signal. Thus, a further step includes operating the wind turbine generator based on the control signal.

In yet another aspect, the present disclosure is directed to a system for operating a doubly-fed generator connected to a power grid using direct-quadrature (d-q) control technology. The system includes one or more sensors configured to measure an alternating-current (a-c) quantity of the power grid and a controller communicatively coupled to a processor. The processor includes a d-q control loop having at least one symmetric control component. The d-q control loop is configured to perform one or more operations, including but not limited to converting the a-c quantity to a d-q quantity, providing the d-q quantity to a d-q control loop within the controller, altering, with a symmetric control component, a transfer function of the d-q control loop, and generating at least one d-q reference signal for the wind turbine generator based on the altered transfer function so as to achieve symmetric control of the wind turbine generator, generating a voltage-current signal for the wind turbine generator based, at least in part, on the at least one d-q reference signal, and operating the wind turbine generator based on the voltage-current signal so as to stabilize sub-synchronous interaction of the wind turbine generator.

Variations and modifications can be made to these exemplary embodiments of the present disclosure. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
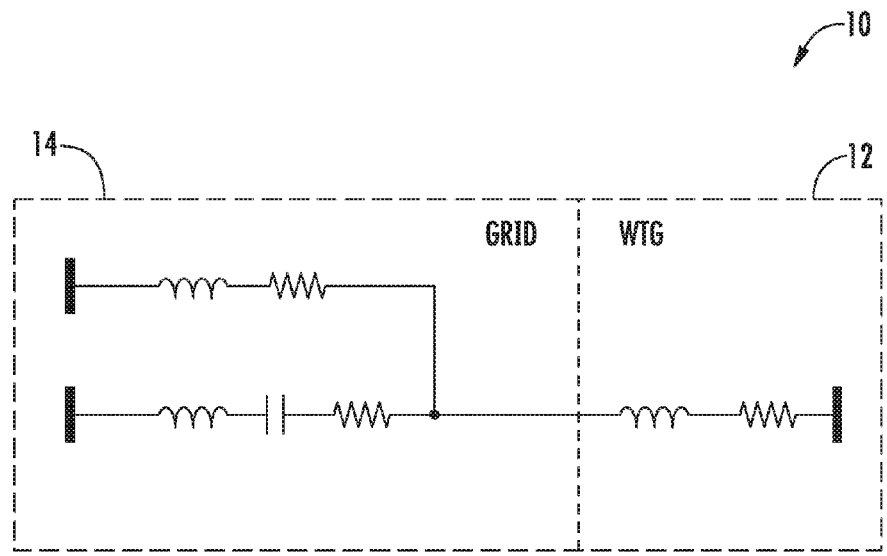
FIG. 1 illustrates a circuit diagram that can result in unstable sub-synchronous interaction (SSI) according to conventional construction.
Figure 2:
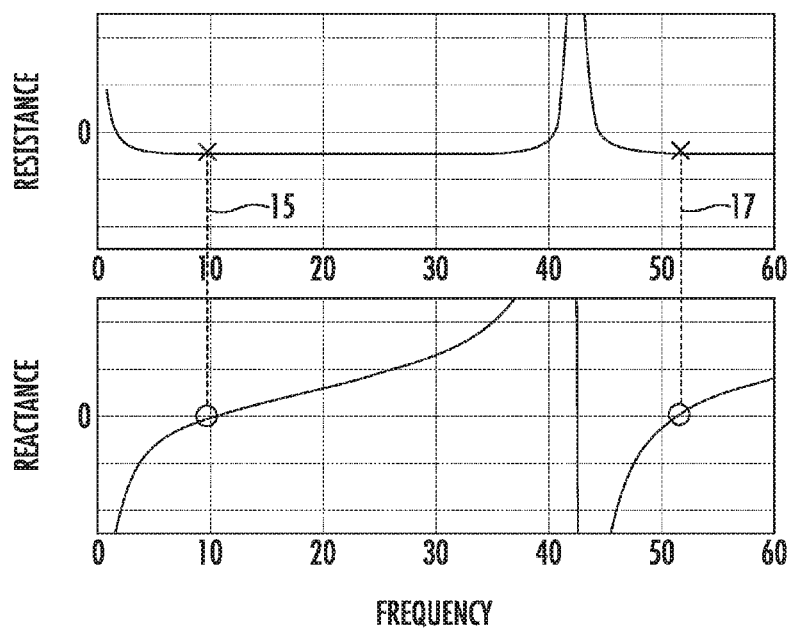
FIG. 2 illustrates various graphs of resistance versus frequency and reactance versus frequency, respectively.
Figure 3:
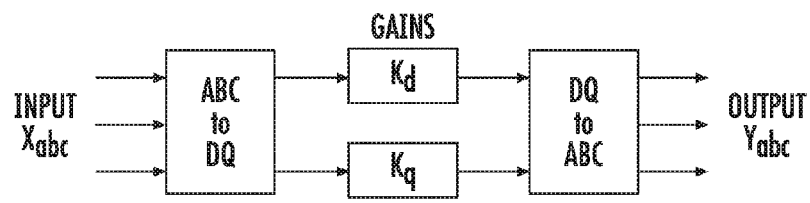
FIG. 3 illustrates a block diagram of a control function for converting an a-c quantity to a d-q quantity according to one embodiment of the present disclosure.
Figure 4:
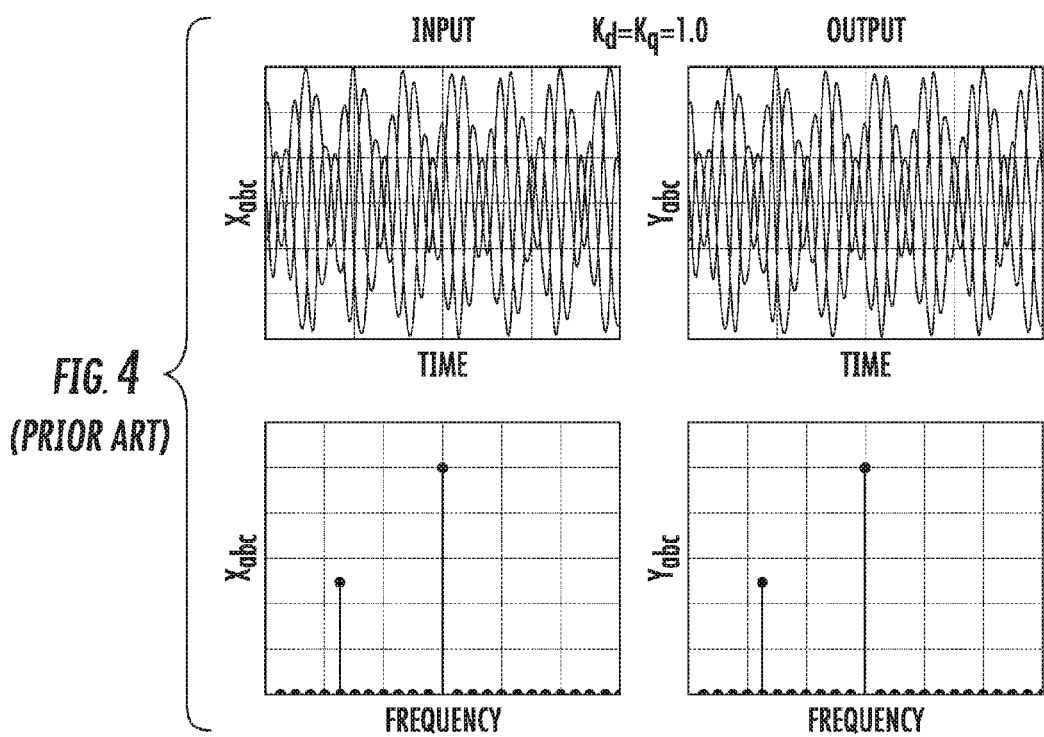
FIG. 4 illustrates various graphs of the input and output a-c quantities versus time and frequency, respectively, particularly illustrating symmetric control having no coupling frequency output.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

Generally, the present disclosure is directed to a system and method for stabilizing sub-synchronous interaction of a wind turbine generator connected to a power grid. More specifically, the system and method is configured to operate the wind turbine generator using direct-quadrature (d-q) control technology. For example, the system measures an alternating-current (a-c) quantity of the power grid and converts the a-c quantity to a d-q quantity (e.g. rotating coordinates) in a controller of the wind turbine generator. The d-q quantity is then provided to a d-q control loop within the wind turbine controller. The system is then configured to alter a transfer function of the d-q control loop with a symmetric control component in the d-q control loop. Thus, the system generates, via the d-q control loop, a d-q reference signal (e.g. one or more current references) for the wind turbine generator based on the altered transfer function so as to achieve symmetric control of the wind turbine generator. As such, the system generates a control signal for the wind turbine generator based, at least in part, on the d-q reference signal(s) and operates the generator based on the control signal.

Controlling the wind turbine generator in this manner provides many advantages not present in prior art control systems. For example, the present disclosure achieves improved sub-synchronous interaction damping using internal controls rather than relying on external approaches. Therefore, the present disclosure is less complex and therefore more economical than previous solutions. In addition, the method assures a positive damping of the wind turbine generator to sub-synchronous interaction.

In order to place the teachings of the current invention into context, a review of aspects of components for generating electricity using a wind turbine containing a power electronic converter are now discussed. However, it should be understood that the control method of the present disclosure may also be applied to other converters used in battery energy storage systems, solar inverters, static var compensators (STATCOM), and the like.

Figure 7:
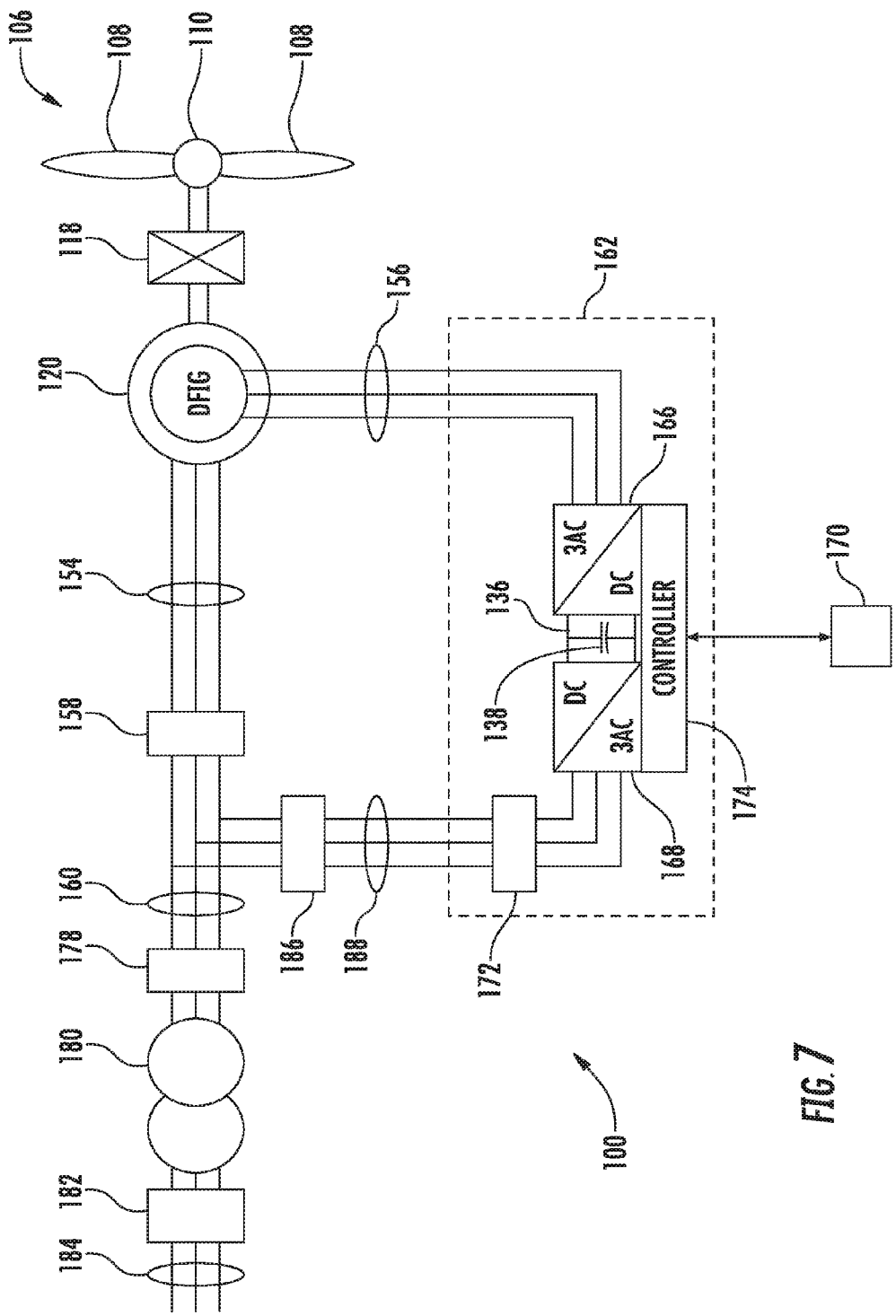
FIG. 7 illustrates a schematic diagram of a control system for a wind turbine according to one embodiment of the present disclosure.

Referring to FIG. 7, there is shown an exemplary embodiment of aspects of wind turbine system 100. As shown, a rotor 106 includes a plurality of rotor blades 108 coupled to a rotating hub 110, and together define a propeller. The propeller is coupled to an optional gear box 118, which is, in turn, coupled to a generator 120. In accordance with present disclosure, the generator 120 may be a doubly fed generator 120 (DFG).

The DFG 120 is typically coupled to a stator bus 154 and a power conversion assembly 162 via a rotor bus 156. The stator bus 154 provides output of three-phase power from a stator (not separately illustrated) of the DFG 120 and the rotor bus 156 provides output of three-phase power from a rotor (not separately illustrated) of the DFG 120. With particular reference to the power conversion assembly 162, the DFG 120 is coupled via the rotor bus 156 to a rotor-side converter 166. The rotor-side converter 166 is coupled to a line-side converter 168 which in turn is coupled to line-side bus 188. In exemplary configurations, the rotor-side converter 166 and the line-side converter 168 are configured for a normal operating mode in a three-phase, two-level, Pulse Width Modulation (PWM) arrangement using Insulated Gate Bipolar Transistor (IGBT) switching devices. The rotor-side converter 166 and the line-side converter 168 are coupled via a DC link 136 across which is the DC link capacitor 138.

In typical configurations, various line contactors and circuit breakers including, for example, grid breaker 182, may be included to isolate the various components as necessary for normal operation of the DFG 120 during connection to and disconnection from power grid 184. A system circuit breaker 178 couples the system bus 160 to transformer 180, which is connected to power grid 184 via grid breaker 182. In addition, various circuit breakers and switches within the wind turbine system 100, including grid breaker 182, system breaker 178, stator sync switch 158, converter breaker 186, and line contactor 172 are configured to connect or disconnect corresponding buses, for example, when current flow is excessive and can damage the components of the wind turbine system 100 or for other operational considerations. Additional protection components (not shown) may also be provided.

In operation, power generated at the DFG 120 by the rotating rotor 106 is provided via a dual path to a power grid 184. The dual paths are defined by the stator bus 154 and the rotor bus 156. On the rotor bus 156 side, sinusoidal three-phase a-c power is converted to direct current (DC) power by the power conversion assembly 162. The converted power from the power conversion assembly 162 is combined with the power from the stator of the DFG 120 to provide three-phase power having a frequency that is maintained substantially constant, e.g. at a 60-Hz a-c level. The power conversion assembly 162 compensates or adjusts the frequency of the three-phase power from the rotor of the DFG 120 for changes.

The power conversion assembly 162 may also include a controller 174 to control the operation of the rotor-side converter 166 and the line-side converter 168. It should be noted that the controller 174, in typical embodiments, is configured as an interface between the power conversion assembly 162 and a control system 170 of the system 100. In additional embodiments, the power conversion assembly 162 receives control signals from, for example, the control system 170 via the controller 174. The control signals are based, among other things, on sensed conditions or operating characteristics of the wind turbine system 100. Typically, the control signals provide for control of the operation of the power conversion assembly 162. For example, feedback in the form of sensed speed of the DFG 120 may be used to control the conversion of the output power from the rotor bus 156 to maintain a proper and balanced three-phase power supply. Other feedback from other sensors also may be used by the control system 170 to control the power conversion assembly 162, including, for example, stator and rotor bus voltages and current feedbacks. Using the various forms of feedback information, and for example, switching control signals, stator synchronizing switch control signals and system circuit breaker control (trip) signals may be generated in any known manner.

Figure 8:
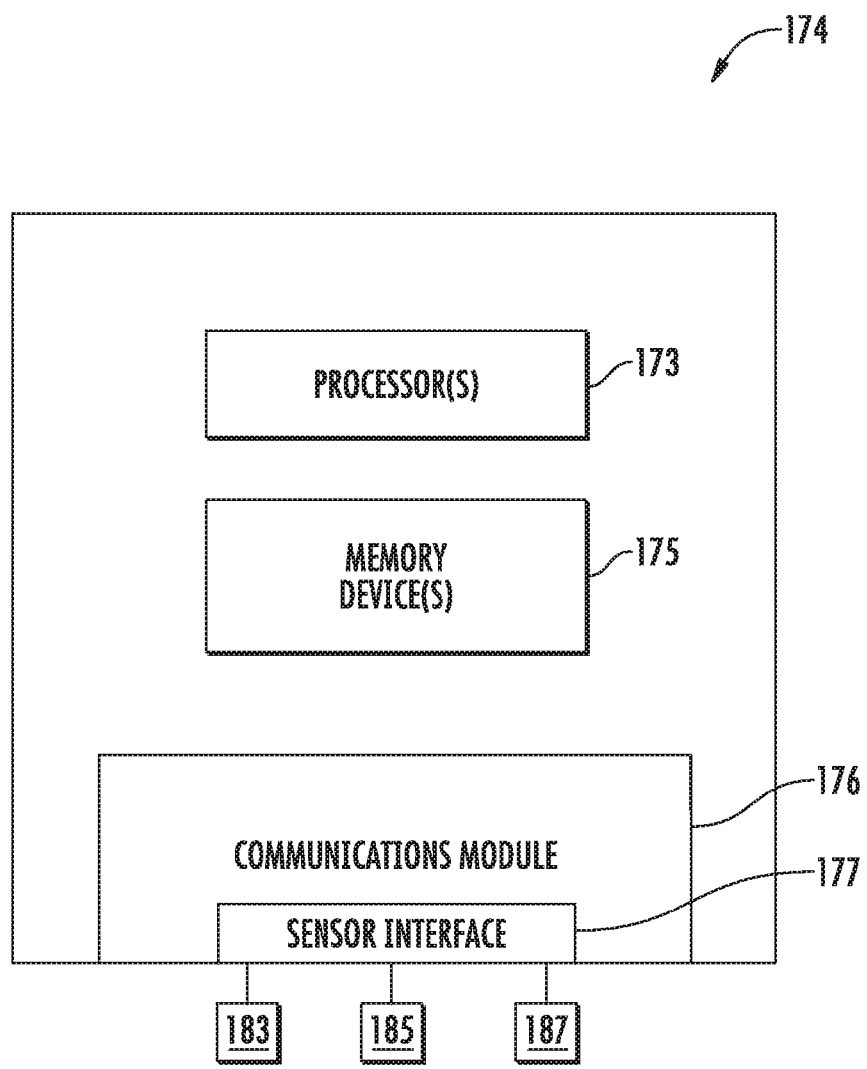
FIG. 8 illustrates a block diagram of one embodiment of suitable components of a control system of a wind turbine according to the present disclosure.

Referring now to FIG. 8, a block diagram of one embodiment of suitable components that may be included within the controller 174 (or control system 170) is illustrated in accordance with aspects of the present subject matter. As shown, the controller 174 may include one or more processor(s) 173 and associated memory device(s) 175 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

Additionally, the memory device(s) 175 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Further, the controller 174 may also include a communications module 176 to facilitate communications between the controller 174 and the various components of the wind turbine system 100. For instance, the communications module 176 may include a sensor interface 177 (e.g., one or more analog-to-digital converters) to permit the signals transmitted by one or more sensors 183, 185, 187 to be converted into signals that can be understood and processed by the controller 174. It should be appreciated that the sensors 183, 185, 187 may be communicatively coupled to the communications module 176 using any suitable means. For example, as shown in FIG. 8, the sensors 183, 185, 187 are coupled to the sensor interface 177 via a wired connection. However, in other embodiments, the sensors 183, 185, 187 may be coupled to the sensor interface 177 via a wireless connection, such as by using any suitable wireless communications protocol known in the art. As such, the processor 173 may be configured to receive one or more signals from the sensors 183, 185, 187.

The sensors 183, 185, 187 of the wind turbine system 100 may be any suitable sensors configured to measure any operating or loading condition at or near the wind turbine. For example, the sensors may include blade sensors for measuring a pitch angle of one of the rotor blades 108 or for measuring a loading acting on one of the rotor blades 108; generator sensors for monitoring the generator (e.g. torque, rotational speed, acceleration and/or the power output); and/or various wind sensors for measuring various wind parameters. In addition, the sensors 183, 185, 187 may be located near the ground of the wind turbine, on the nacelle, or on a meteorological mast of the wind turbine. It should also be understood that any number or type of sensors may be employed and at any location. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Figure 9:
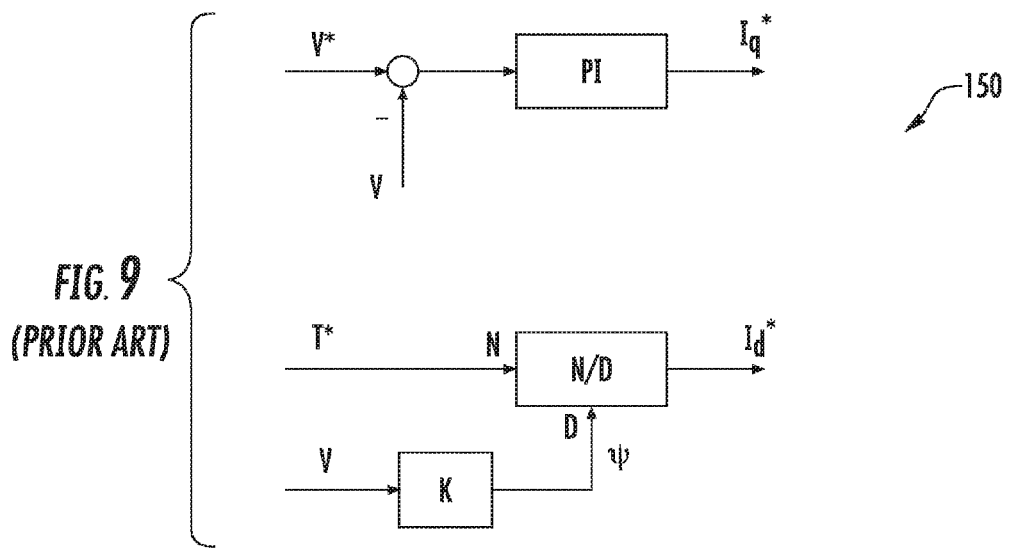
FIG. 9 illustrates a simplified control block diagram according to conventional construction, particularly illustrating the generation of d-axis and q-axis current references.
Figure 10:
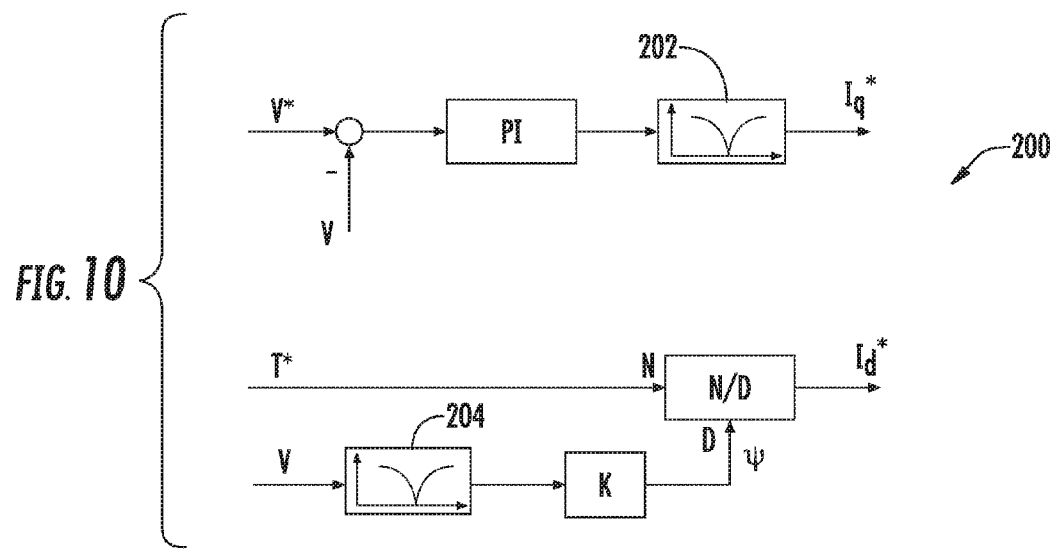
FIG. 10 illustrates a simplified control block diagram according to one embodiment of the present disclosure, particularly illustrating the generation of d-axis and q-axis current references that provide symmetric control of the wind turbine generator.

Referring now to FIGS. 9 and 10, various control loop diagrams that may be implemented by the controller 174 for generating a control signal for the wind turbine generator are illustrated. For example, such control loops are configured to produce constant and stable current and/or voltage commands for the DFG 120. More specifically, FIG. 9 illustrates a control loop diagram 150 for generating current references (e.g. $I_q^*$ and $I_d^*$) according to conventional construction. In contrast, FIG. 10 illustrates a control loop diagram 200 for generating d-q reference signals (e.g. d-q current references $I_q^*$ and $I_d^*$) for improving sub-synchronous interaction damping of the DFG 120 by creating symmetric control design via one or more symmetric control components 202, 204 according the present disclosure. More specifically, as shown, the symmetric control components 202, 204 correspond to a plurality of filters 202, 204 that alter the transfer functions of the d-q loop to achieve symmetric control.

As shown in FIG. 10, the q-axis current reference $I_q^*$ regulates voltage of the DFG 120 and the d-axis current reference $I_d^*$ regulates torque of the DFG 120. For this reason, the two axes can be designed based on different philosophies and hence become asymmetric (i.e. the transfer functions of the two axes are different). More specifically, the q-axis current reference $I_q^*$ is the output of the voltage regulator that controls the terminal voltage magnitude V of the DFG 120 based on a voltage reference V*. For example, as shown in FIG. 10, the control loop 200 calculates the q-axis current reference by determining a proportional integral (PI) derivative of the terminal voltage V of the DFG 120 and filtering the derivative via filter 202.

Further, the control loop 200 calculates the d-axis current reference $I_d^*$ as a function of a torque reference T* and a magnetic flux Ψ. More specifically, the d-axis current reference $I_d^*$ is calculated from the torque reference T* by dividing the torque reference T* by the magnetic flux Ψ as shown at N/D, i.e. numerator divided by denominator. In addition, the magnetic flux Ψ is generally proportional to the DFG 120 terminal voltage magnitude V. As such, in certain embodiments, the control loop 200 determines the magnetic flux Ψ as a function of the terminal voltage V of the DFG 120, filtering the terminal voltage V, and multiplying the filtered terminal voltage by a multiplier, e.g. K. More specifically, in certain embodiments, the multiplier K may be a function of the stator voltage frequency (e.g. $1/\omega_s$).

From the small signal point of view, the transfer function between the DFG 120 terminal voltage V and the current references $I_q^*$ and $I_d^*$ can be expressed as:

$$\delta I_q^* = -G_{PI} \cdot \delta V \quad \text{Equation (1)}$$

$$\delta I_d^* \approx -\frac{T}{KV_0^2} \delta V \quad \text{Equation (2)}$$

where $G_{PI}$ is the transfer function of the PI regulator, and $V_0$ is the steady state voltage magnitude.

As shown by Equations (1) and (2), the transfer function from V to $I_d^*$ is dependent on operating condition(s) of the DFG 120. For example, at low power output when T is close to zero, the gain from V to $I_d^*$ is also close to zero. Further, the difference between the two axes creates asymmetric control and hence the coupling frequencies effect described herein (e.g. FIG. 5). In the context of the DFG 120, low-power/low-speed operation usually presents the most challenging condition as the resistance of the rotor 106 becomes the most negative in the sub-synchronous frequency range. Thus, the system 200 of the present disclosure includes one or more symmetric control components 202, 204 (e.g. one or more filters or control compensators) as illustrated in FIG. 10 to particularly address low power/low speed operation of the DFG 120. More specifically, in certain embodiments, the symmetric control components 202, 204 can be applied to the control path in each of the two (or both) axes such that the resulting transfer functions are similar to each other (e.g. resume symmetry) in a certain frequency range (i.e. the sub-synchronous frequency range). A control compensator as described herein generally refers to a component in a control system that improves an undesirable frequency response in a feedback and control system.

More specifically, in certain embodiments, the symmetric control components 202, 204 may be notch filters with a blocking frequency of about 30 Hz (which is generally the median of the sub-synchronous frequency range). It should be understood by those of ordinary skill in the art, however, that the blocking frequency may be any suitable frequency and may vary depending on the system. By including the filters 202, 204 in the path from V to $I_{d-q}^*$, as shown in FIG. 10, the difference between the two axes is effectively reduced for the frequency range around the blocking frequency, i.e. where SSI instability is typically found. Meanwhile, the filters 202, 204 allow for enough bandwidth for the low frequency control signals (i.e. low frequency in the d-q rotating frame) to pass through without much attenuation or phase lag. In addition, as shown in FIG. 10, the filter 204 is included for the V input for $I_D$ generation but not for the torque reference T*. In such an embodiment, the absence of a filter for the torque reference T* avoids varying the system mechanical characteristics since the torque reference T* is not affected by the filter.

The filters 202, 204 as described herein may be any suitable filters known in the art. For example, in certain embodiments, the filters 202, 204 may include band-stop filters or band-rejection filters. A band-stop or band-rejection filter generally refers to a filter that passes most frequencies unaltered, but attenuates signals in a specific range to very low levels. As such, band-stop filters are the opposite of band-pass filters which pass frequencies within a certain range and rejects (attenuates) frequencies outside that range. More specifically, the filters 202, 204 may be notch filters which are band-stop filters with a narrow stopband (i.e. a high Q factor). In still additional embodiments, the filters 202, 204 may include band-pass filters which are a combination of low-pass and high-pass filters. Thus, in particular embodiments, the filters 202, 204 may include a low-pass filter followed by a high-pass filter in series. A low-pass filter generally refers to a filter that passes signals with a frequency lower than a certain cutoff frequency and attenuates signals with frequencies higher than the cutoff frequency. The amount of attenuation for each frequency depends on the filter design. A low-pass filter is the opposite of a high-pass filter, which is a filter that passes signals with a frequency higher than a certain cutoff frequency and attenuates signals with frequencies lower than the cutoff frequency. In still further embodiments, the filters 202, 204 may include rolling average filters.

Figure 5:
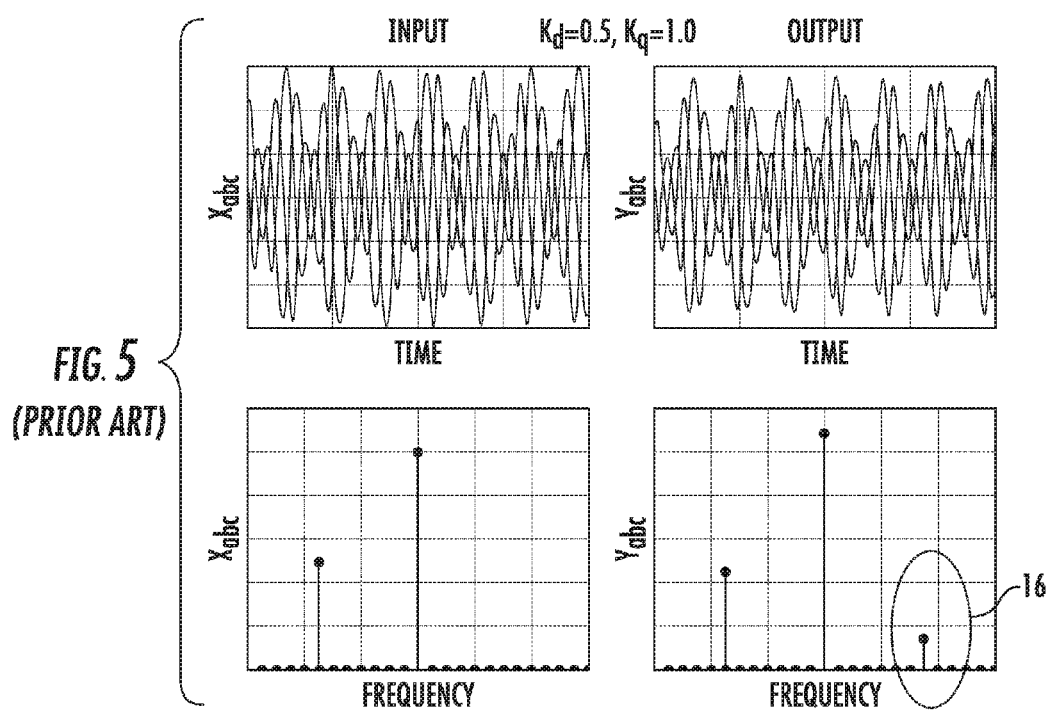
FIG. 5 illustrates various graphs of the input and output a-c quantities versus time and frequency, respectively, particularly illustrating asymmetric control that creates a coupling frequency output.
Figure 6:
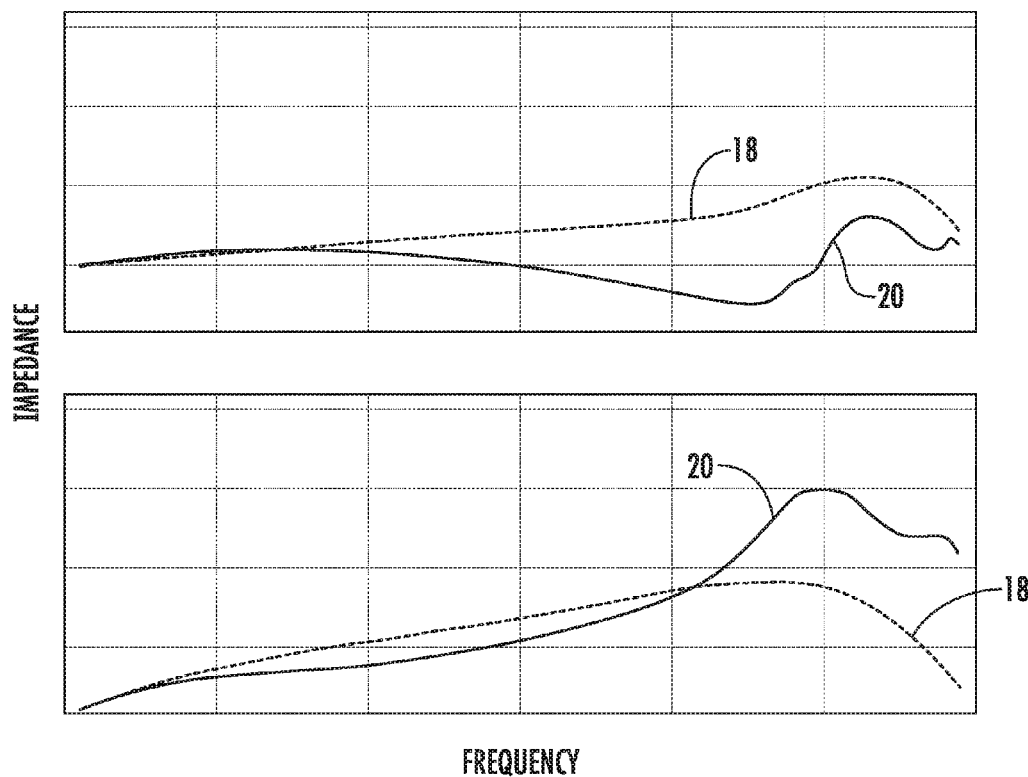
FIG. 6 illustrates various graphs of impedance versus frequency and impedance versus frequency, respectively, for different grid conditions according to conventional construction.
Figure 11:
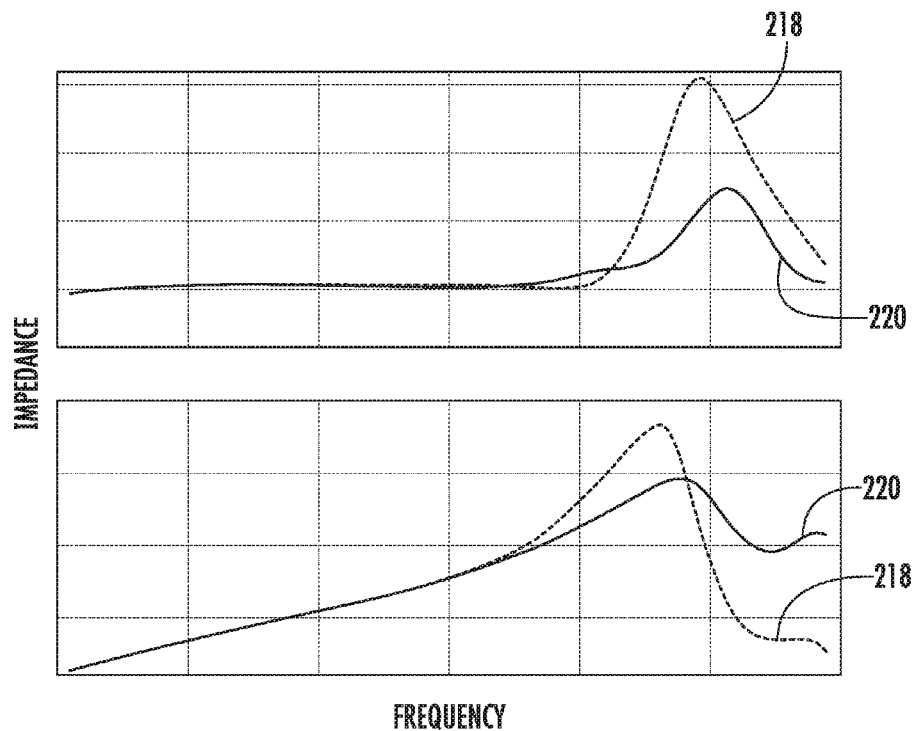
FIG. 11 illustrates various graphs of impedance versus frequency and impedance versus frequency, respectively, for different grid conditions according to one embodiment of the present disclosure.

Referring now to FIG. 11, a graph illustrating potential advantages of the present disclosure is illustrates. As shown, the coupling frequencies effect discussed in reference to FIG. 5 is significantly reduced as reflected by the corresponding generator frequency impedances 218, 220 under different grid conditions in most of the sub-synchronous frequency range (e.g. until the resistance is positively high and SSI is not a concern).

Figure 12:
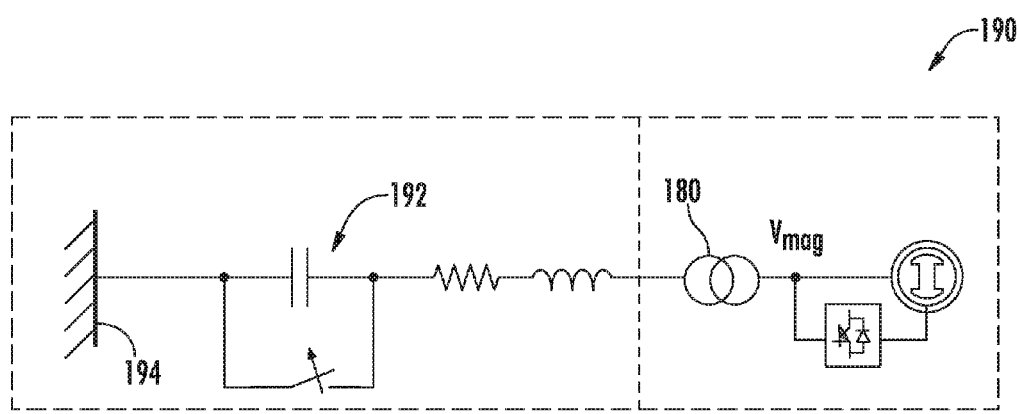
FIG. 12 illustrates a circuit diagram according to one embodiment of the present disclosure, particularly illustrating an insertion event provided by a series compensation capacitor.
Figure 13:
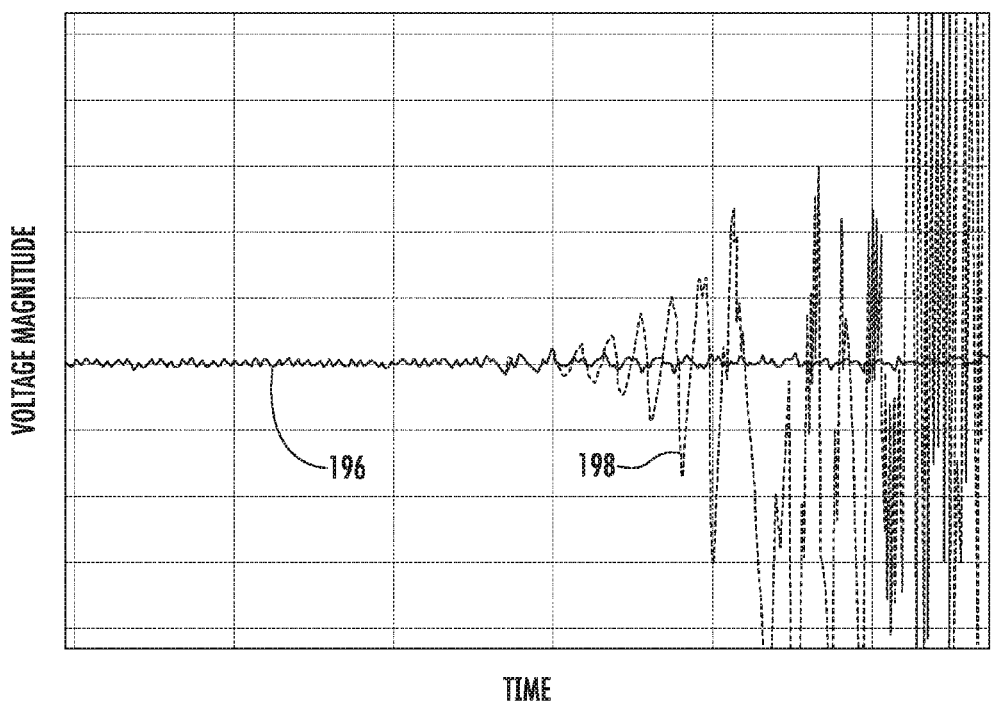
FIG. 13 illustrates a graph comparing the transient response of the wind turbine generator before and after the control technology of the present disclosure is implemented according to one embodiment of the present disclosure.

Advantages of the control technology of the present disclosure were evaluated in a time domain simulation of its effectiveness in stabilizing SSI transients and are further illustrated in FIGS. 12 and 13. More specifically, FIG. 12 illustrates a circuit diagram 190 according to the present disclosure having a series compensation capacitor 192 configured to provide an insertion event as described herein. Before the installation of the series compensation capacitor 192, the grid short circuit ratio (SCR) between the infinite bus 194 and the high voltage side of the wind turbine transformer 180 was approximately 0.77 pu. After opening the bypass switch of the series compensation capacitor 192, the grid SCR was increased to 1.34 pu. As shown in FIG. 13, a graph comparing the transient response of the DFG 120 before and after adding one or more of the filters 202, 204 to the current reference path is illustrated. As shown, the control technology of the present disclosure (curve 196) stabilizes the SSI when compared to prior art control technologies (curve 198).

Figure 14:
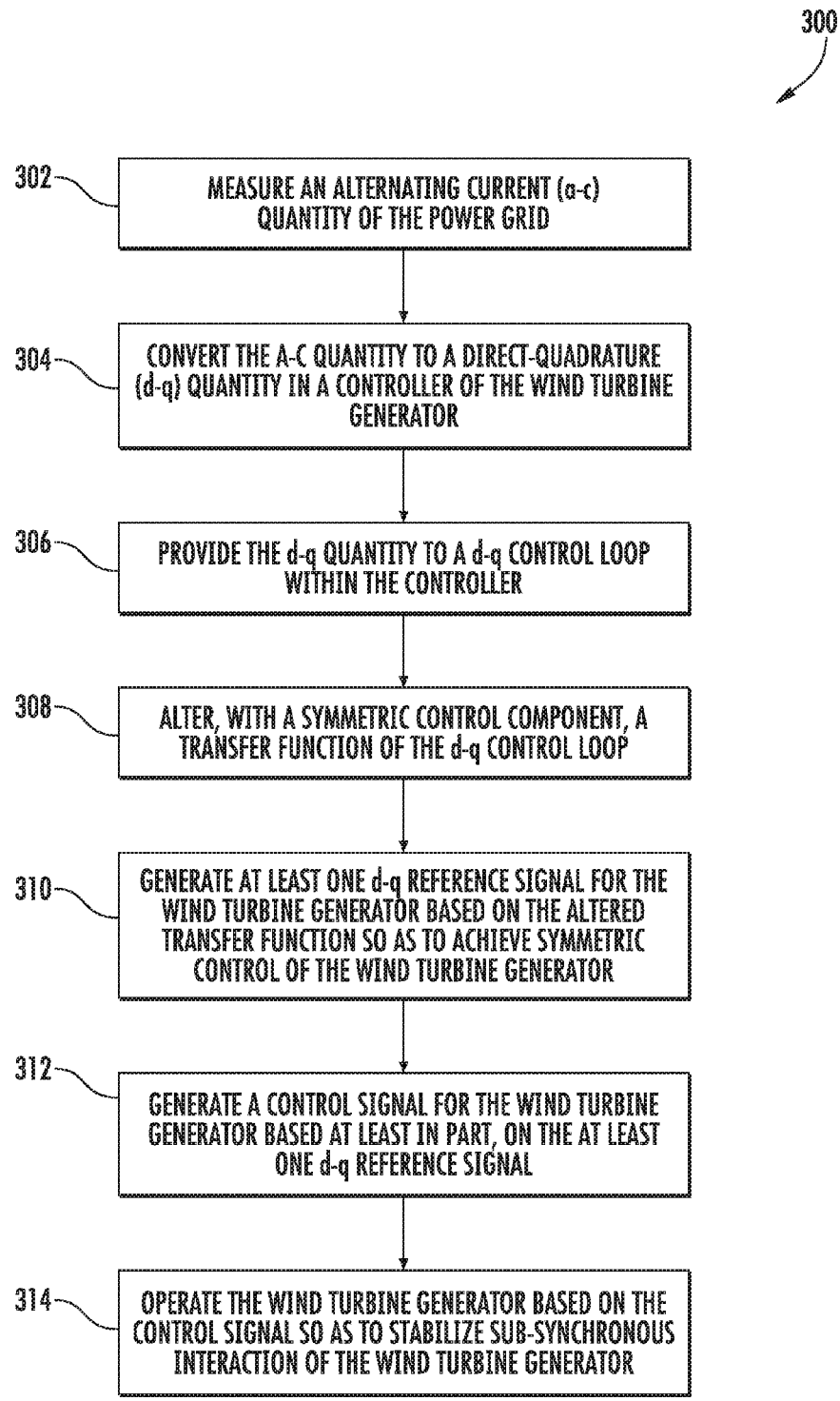
FIG. 14 illustrates a flow diagram of one embodiment a method for stabilizing sub-synchronous interaction (SSI) of a wind turbine generator by symmetric control design.

Referring now to FIG. 14, a flow diagram of a method 300 for operating a wind turbine generator connected to a power grid using d-q control technology according to the present disclosure is illustrated. As shown at 302, the method 300 includes measuring an a-c quantity of the power grid. At 304, the method 300 includes converting the a-c quantity to a d-q quantity in a controller of the wind turbine generator. At 306, the method 300 includes filtering the d-q quantity in a control loop of the controller via at least one filter. At 308, the method includes generating a control signal for the wind turbine generator based on the filtered d-q quantity. Further, at 310, the method includes operating the wind turbine generator based on the control signal so as to stabilize sub-synchronous interaction of the wind turbine generator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine generator connected to a power grid using direct-quadrature (d-q) control technology, the wind turbine generator having a stator and a rotor, the rotor being coupled to the power grid via a power conversion assembly, the power conversion assembly having a rotor-side power converter and a grid-side power converter, the method comprising:

measuring an alternating-current (a-c) quantity of the power grid; converting the a-c quantity to a d-q quantity in a controller of the wind turbine generator;

providing the d-q quantity to a d-q control loop within the controller;

calculating, via the d-q control loop, a q-axis current reference via a voltage input path by determining an error signal using a terminal voltage of the wind turbine generator and filtering the error signal using a first symmetric control filter using a blocking frequency or a blocking frequency range, the q-axis current reference regulating voltage of the wind turbine generator;

calculating, via the d-q control loop, a d-axis current reference via a torque input path as a function of a torque reference and a magnetic flux, the d-axis current reference regulating torque of the wind turbine generator;

determining the magnetic flux by filtering the terminal voltage of the wind turbine generator using a second symmetric control filter using the blocking frequency or the blocking frequency range, the second symmetric control filter being outside of the torque input path;

determining a control signal for the wind turbine generator as a function of the d-axis current reference and the q-axis current reference via the rotor-side converter;

and, operating the wind turbine generator based on the control signal so as to stabilize sub-synchronous interaction of the wind turbine generator.

2. The method of claim 1, wherein the first and second filters each comprise at least one of a notch filter, a low-pass filter, a high-pass filter, or combinations thereof.

3. The method of claim 1, wherein the wind turbine generator comprises a doubly-fed generator, wherein the control loop is configured to control a voltage of the rotor via the rotor-side power converter.

4. The method of claim 1, wherein the control signal comprises at least one of a current signal or a voltage signal.

5. The method of claim 1, wherein determining the magnetic flux further comprises multiplying the filtered terminal voltage by a multiplier.

6. A method for improving sub-synchronous interaction (SSI) damping of a doubly-fed generator of a wind turbine connected to a power grid, the generator having a stator and a rotor, the rotor being coupled to the power grid via a power conversion assembly, the power conversion assembly having a rotor-side power converter and a grid-side power converter, the method comprising:

calculating, via the d-q control loop, a q-axis current reference via a voltage input path by determining an error signal using a terminal voltage of the wind turbine generator and filtering the error signal using a first symmetric control filter using a blocking frequency or a blocking frequency range, the q-axis current reference regulating voltage of the wind turbine generator;

calculating, via the d-q control loop, a d-axis current reference via a torque input path as a function of a torque reference and a magnetic flux, the d-axis current reference regulating torque of the wind turbine generator;

determining the magnetic flux by filtering the terminal voltage of the wind turbine generator using a second symmetric control filter using the blocking frequency or the blocking frequency range, the second symmetric control filter being outside of the torque input path;

determining a control signal for the wind turbine generator as a function of the d-axis current reference and the q-axis current reference via the rotor-side converter;

and, operating the wind turbine generator based on the control signal.

7. A system for operating a doubly-fed generator connected to a power grid using direct-quadrature (d-q) control technology, the generator having a stator and a rotor, the rotor being coupled to the power grid via a power conversion assembly, the power conversion assembly having a rotor-side power converter and a grid-side power converter, the system comprising:

one or more sensors configured to measure an alternating-current (a-c) quantity of the power grid;

a controller communicatively coupled to a processor, the processor comprising a d-q control loop having at least one symmetric control component, the d-q control loop being configured to perform one or more operations, the one or more operations comprising:

converting the a-c quantity to a d-q quantity:

providing the d-q quantity to a d-q control loop within the controller;

calculating, via the d-q control loop, a q-axis current reference via a voltage input path by determining an error signal using a terminal voltage of the wind turbine generator and filtering the error signal using a first symmetric control filter using a blocking frequency or a blocking frequency range, the q-axis current reference regulating voltage of the wind turbine generator;

calculating, via the d-q control loop, a d-axis current reference via a torque input path as a function of a torque reference and a magnetic flux, the d-axis current reference regulating torque of the wind turbine generator;

determining the magnetic flux by filtering the terminal voltage of the wind turbine generator using a second symmetric control filter using the blocking frequency or the blocking frequency range, the second symmetric control filter being outside of the torque input path;

determining a voltage-current signal for the wind turbine generator as a function of the d-axis current reference and the q-axis current reference via the rotor-side converter;

and, operating the wind turbine generator based on the voltage-current signal so as to stabilize sub-synchronous interaction of the wind turbine generator.

8. The system of claim 7, wherein the first and second symmetric control filters comprise at least one of a notch filter, a low-pass filter, a high-pass filter, or combinations thereof.

9. The system of claim 7, wherein determining the magnetic flux further comprises multiplying the filtered terminal voltage by a multiplier.

\* \* \* \* \*